United States Patent [19]

Newville

[11] Patent Number: 4,524,490
[45] Date of Patent: Jun. 25, 1985

[54] CRAWFISH PEELER

[76] Inventor: Randy Newville, 12102 Falcon St., Apt. D., Lafayette, La. 70506

[21] Appl. No.: 539,706

[22] Filed: Oct. 6, 1983

[51] Int. Cl.³ .............................................. A22C 29/02
[52] U.S. Cl. .......................................... 17/48; 17/73
[58] Field of Search ................... 17/48, 66, 68, 69, 73, 17/70, 71, 48; 30/124, 234; 294/99.2

[56] References Cited

U.S. PATENT DOCUMENTS 4,385,422  5/1983  Ingalls et al. ........................... 17/48

FOREIGN PATENT DOCUMENTS 2822706 11/1978 Fed. Rep. of Germany ..... 294/99.2
 648873  1/1951 United Kingdom ............... 294/99.2
2074080 10/1981 United Kingdom ............... 294/99.2
 588081  1/1978 U.S.S.R. ............................... 294/99.2

Primary Examiner—Willie G. Abercrombie
Attorney, Agent, or Firm—Keaty & Keaty

[57] ABSTRACT

A hand-held tool for removing the meat from a crawfish tail having a handle adapted to the human hand containing a pair of spring biased opposed elongated concave tongs with curved inward tips. In operation an individual crawfish is broken to separate the head from the tail. The crawfish peeler is inserted into the tail, the tongs passing around the crawfish tail meat within the lower shell; and the crawfish tail meat within and, by means of their differential shape, breaking the individual ligamentary connection between the crawfish meat and the crawfish tail, straightening the shell and encompassing substantially all the crawfish tail meat in a single piece. The tongs are then squeezed slightly together by hand and withdrawn; their shape is such that the crawfish tail meat is pulled out as a single intact piece and substantially no fragments of crawfish remain within the shell. In practice the tool permits the removal of intact crawfish tail meat at a considerably higher rate than hand shelling the crawfish.

4 Claims, 5 Drawing Figures

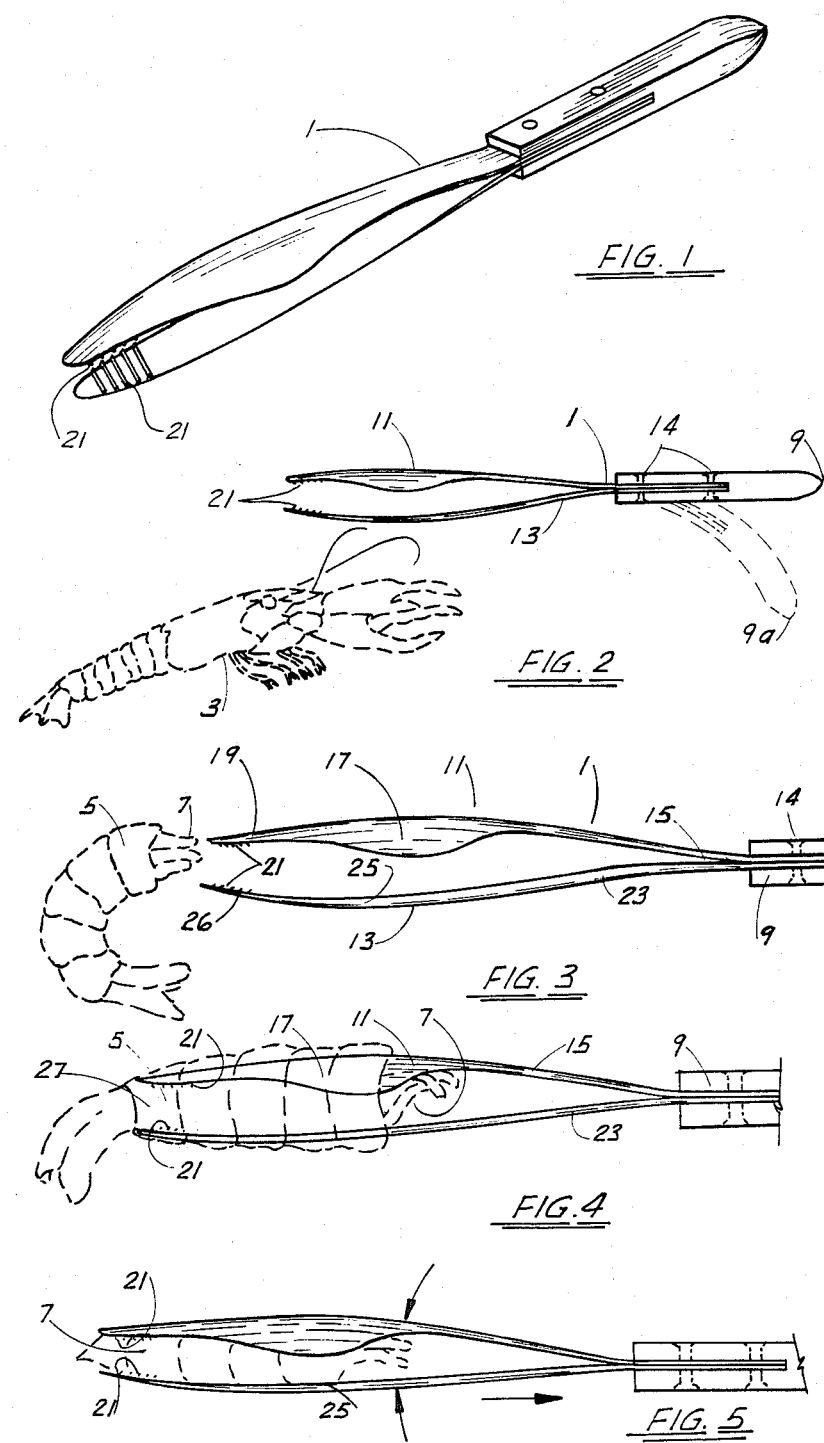

CRAWFISH PEELER

BACKGROUND OF THE INVENTION

This invention relates to a method for enabling an individual to hand remove the meat from a cooked crawfish in a much more efficient manner, providing a much more satisfactory end product than heretofore has been possible.

There are two major edible small crustaceous in common use as food within the United States. The primary crustacean is the common shrimp, which is relatively familiar to almost all persons in the United States. The shrimp has a relatively thin exoskeleton, or shell, which is easily peeled by hand from the shrimp body either while the shrimp is raw or while the shrimp is cooked. In addition the shell is quite thin, very flexible, and has a marked spinal division or crease, all of which have led to the widespread introduction and invention of numerous methods of automatically peeling shrimp. These methods in general take advantage of the fact that under compressive pressure shrimp meat is generally extruded intact from the very flexible shell. Alternately, the machinery takes advantage of the fact that the shrimp shell, especially on raw shrimp, is easily cut by knives while avoiding cutting the shrimp meat.

The crawfish is a much less widely exploited crustaceon. Although it is extremely popular as a staple food item in Southern Louisiana, and has a marked acceptance, although less exploitation, among persons, especially of Scandanavian descent, within the Central and Midwestern United States, it is relatively unknown as a food item in the rest of the country.

Like the shrimp, the crawfish has almost all of its edible meat in the tail section; and the head of the crawfish must be removed. Unlike the shrimp, however, the crawfish most closely resembles a small Maine lobster, having large, meat containing claws and an extremely stiff and hard exoskeleton. Like the lobster, the crawfish when cooked turns a bright red. When removed from cooking, the crawfish tail is tightly curved; the meat in a rigid, plate-like shell, extremely resistant to cutting, having a marked brittleness and a low ductility.

The normal method of eating a crawfish, which requires that the crawfish meat be removed from the shell, involves breaking the crawfish, and removing the head piece which contains little edible matter, straightening the shell with the fingers, and attempting to squeeze the shell, much in the manner of squeezing a tube of toothpaste from the bottom.

If the hungry gourmet or afficionado has developed the right touch of finger and forefinger, he quite often can squeeze out the crawfish meat. More often, the meat either breaks, leaving a portion in the shell, or it does not come out at all. At this point, the by now probably famished diner is reduced to attempting to piecemeal dissemble a shell structure as impervious as that found in a lobster tail but approximately 1/10th the size.

Crawfish is a very succulent meat comparable to the lobster in flavor but considerably more delicate. In addition crawfish can be raised readily as an adjunct to rice farming. The crawfish life cycle matches the flood and drainage cycle in standard rice culture. Crawfish are completely compatible with the operation of a rice field, and as a result many rice farmers raise crawfish as a second crop. However the general difficulty of eating crawfish has restricted the market essentially to a very small subgroup within Louisiana and a few related states who, for cultural reasons, or out of familiarity with the crawfish, look upon it as a preferential food.

The difficulty of eating the crawfish, the small amount of meat that is obtained for a considerable amount of physical labor when hand shucking crawfish, have all combined to restrict the widespread acceptance of crawfish as an alternative to shrimp as in a seafood. This has been refected most recently in a severe overproduction of crawfish in Southern Louisiana and a consequent severe drop in the price. The crawfish industry is apparently at a saturation point in terms of providing adequate crawfish supplies to those customers currently within its market. Any further production and any further expansion of this particular industry will depend upon an expended customer base, which in turn will depend upon a solution of the problem of removing the meat from the crawfish. As a comparison, the current shrimp industry is a creature of the invention of automated means for removing shrimp meat from the shrimp shell. Shrimp Factories are now the primary direct market for the shrimp fisherman.

It should be noted that some of the disadvantages of peeling crawfish are: (1) the spicey, staining juice that is produced from boiling the crawfish often flies from the custacean while attempting to hand peel. Crawfish has not been something you wanted to eat while wearing dress clothes or formal attire; (2) while peeling the sections of the shell, you often find that a force sufficient to break apart the shell can be painful to your fingers; and (3) it should also be noted that a drawback in eating crawfish is due to the difficulty small children have peeling them. So, in turn, while peeling your child's crawfish, your own become cold and undesirable.

SUMMARY OF THE INVENTION

It is the purpose of this invention to solve the current problems in removing crawfish meat from a crawfish shell by providing a convenient, hand-held tool which makes it practical to any individual to rapidly and easily remove the edible meat from the tail of the crawfish without possessing extensive experience or mechanical skill.

Although I have denoted this invention as crawfish peeler, in fact it is not a peeler but a meat remover; peeling the shell of a crawfish is essentially impossible, and this is the primary problem leading to the instant invention. In summary, the invention comprises a pair of symetrically-shaped elongate spoon members or tongs which have been particularly adapted for insertion within the tail of the crawfish. By means of the particular tong shape, the peeler, as it is inserted, straightens the normally curved tail of the cooked crawfish, passing simultaneously between the meat and the shell along both the upper and lower sides of the crawfish tail. By means of the particular shape of the tips, the crawfish tail is straightened rather than having the crawfish meat penetrated by the metal tip and broken.

It should be noted that crawfish meat when cooked is considerably more delicate than shrimp meat; it is more tender and has a much greater tendency to break into small particulate forms. It therefore is part of my invention that the particular spoon shape of the tongs which differs between the top and bottom member of my crawfish peeler encloses the meat carefully as the tail is straightened. The shape of the tips is such that the meat is not penetrated but rather it is separated from the sides of the shell at the ligamentary attachment point at the individual shell sections. Upon full insertion of the peeler, the final attachment point of crawfish meat to the tail is broken at the tip end; the meat, being encompassed and enclosed safety within the spoons, it subject to no undue stress which would cause it to break apart and can be extracted intact.

Thus as can be seen, this invention provides a relatively quick means, consisting primarily of the steps of insertion, squeeze, and removal, for extracting the intact meat from a crawfish tail. It is the essence of the invention that the particular shape of the two spoon members comprises all the work of removing the crawfish meat and almost no skill is required on the part of the user.

This invention will make it much easier for the average consumer to be able to eat and enjoy crawfish, expanding the market and increasing the enjoyment of this particular edible crustacean.

It is the object of this invention to provide a handheld tool which permits anyone to easily remove all the meat from the tail of a crawfish.

It is another object of this invention to provide an individual crawfish meat remover which permits the unskilled user to obtain the meat of the crawfish tail in an intact form.

It is a further object of this invention to allow any person to rapidly peel or remove the meat from a large number of crawfish tails for the limited expenditure of physical energy.

It is a further object of the invention to provide a mechanical improvement that will vastly expand the enjoyability and acceptance of crawfish as a food, thus rapidly increasing the market for crawfish within the United States by making it easy to enjoy the crawfish.

These and all the other objects of this invention are more clearly pointed out in the detailed description to follow.

DETAILED DESCRIPTION OF THE DRAWINGS

FIG. 1 is a view of the overall Crawfish Peeler.

FIG. 2 is a view of the Crawfish Peeler in side profile in comparison to the size of the average crawfish.

FIG. 3 shows the opposing tongs of the crawfish peeler at a position just before entry or insertion into a crawfish tail.

FIG. 4 shows the crawfish peeler fully inserted into a crawfish tail.

FIG. 5 shows the crawfish peeler after extraction of the crawfish tail meat from the shell.

DETAILED DESCRIPTION OF THE PREFERRED EMBODIMENT

FIG. 1 shows the overall Crawfish Peeler 1 in its preferred embodiment.

FIG. 2 shows the overall Crawfish Peeler 1 in side profile adjacent to a whole crawfish 3 showing the relative sizes of the crawfish peeler in its preferred embodiment and the whole crawfish as commonly cooked and eaten.

Referring to FIG. 2, the Crawfish Peeler is shown as comprising the major assemblies of a handle 9 which in the preferred embodiment is straight or in an alternate embodiment is a curved handle 9a, which is curved to fit the palm of the hand held at an angle; this handle 9, 9a is in either case made out of a relatively non-slip handle material, and is well known to those skilled in the art of making small hand held eating appliances. A preferred material for the handle has been found to be any of the hardwoods which can be decoratively stained or otherwise given a relatively impermeable finish to avoid the absorption of food particles, oils and the like. An alternate material is any of the high density plastics which are currently coming into more common use for eating utensil handles.

Inserted fixably into the handle 9 are two opposing tong members: an upper tong member 11 and a lower tong member 13. As will be later described, these tong members have a differing shape, and the orientation of the two with respect to the crawfish is significant for the most appropriate use of the crawfish peeler. The upper tong member 11 and lower tong member 13 are affixedly attached into the handle by any of the standard means; and in the preferred embodiment by riveting using rivets 14 to provide a strong reinforced holding means.

Referring to FIG. 3, the overall tong 1 is shown in an expanded side view as it will be held prior to insertion into a crawfish tail 5. Within the crawfish tail 5 is found a piece of crawfish meat 7. This meat in the cooked crawfish is extremely tender and will not withstand pulling without breakage. It is fastened to the outer crawfish shell 5 by spaced ligamentary structures periodically found in the shell and more importantly by a major physical connection to the rear of the shell 27. This tail 5 has previously been separated from the crawfish 3 by breaking off the tail from the remainder of the crawfish 3. The tail shell 5 comprises a series of overlapping hard shell-like members covering the upper half of the shell and a series of smaller less rounded lower plates, not shown, covering the bottom half of the shell. The entire shell structure 5 is a unitized construct. As a result of the cooking of the crawfish, the tail 5 assumes a typically curved shape shown in FIG. 3. This shape is typical not only of crawfish but of all the tailed crustaceans including lobsters, and is in fact, an indicator as to whether the crawfish was fresh or, in the case of the lobster, live when it was cooked. A crawfish without a curved tail should not be eaten.

The crawfish peeler 1 is seen to have two opposing tong members an upper tong 11 and a lower tong 13. The upper tong 11 comprises a structure of a springy non-corrosive food compatible material, in the preferred embodiment one of the stainless steels or carbon steels used in knives and the like. It is formed with a substantially flat spring based section 15 fastened into handle 9 by rivets 14 as aforementioned. The tong 11 extends outward and is substantially longer than it is wide. In its outward extension, it is formed into an extended curve having a flattened section 17 and terminating in a returned curve or inwardly curve tip 19. The substantially flat section 17 has a concave curved lateral cross-section that is substantially more curved laterally than the top section 17 is curved extendingly.

The bottom tong 13, has like the top tong 11, a spring based section 23 fixedly attached into handle 9, by for example, rivets 14 or the like. The opposing action and opposing curvature outward of base section 23 in conjuction with the curvature of base section 15 provides a spring like action maintaining a fixed separation between bottom tong 13 and upper tong 11 which separation may be overcome by squeezing, as will be hereinafter described. Bottom tong 13 is comprised of an identical material to upper tong 11 but it is shaped differently, in that it has a substantially concave curved bottom section 25 extending from the spring base 23 in a uniform curved arc to an inwardly curved tip portion 26. Bottom tong 13 is provided with a slight transverse inner curve significantly less extensive than the inner curve of top midsection 17. In the preferred embodiment it has been found necesary only to dish transversely the bottom tong 13 to approximately the same radius of curvature as the lengthwise extended radius of curvature of the overall extended section 25.

it is optionally desirable to provide, for a distance extending inward, on the inner surfaces of upper tong tip 19 and lower tong tip 26 a set of frictional serrations 21 which provide a higher coefficient of friction against a gripped material as will be hereinafter described.

It can thus be seen that in comparison the upper tong 11 is revealed to have a flattened upper section 17 as opposed to the continous smooth curved section of lower tong 13. Likewise in comparison the upper tong 11 has a much stronger and more steeply dished concave transverse cross-section during the midsection 17 than does the lower tong 13 at its midsection 25. Thus while both the upper tong 11 and the lower tong 13 are concave both extensibly along their length and transversely across their width, the amounts of curvature differ and these differing curvatures are significant operationally, as will be described below.

Referring now to FIG. 4 and FIG. 5, in use the tongs are held in one hand, grasping the handle 9, with the forefinger and thumb of the hand free to squeeze the outer surface of upper base spring section 15 and lower base spring section 23 in opposition so as to permit the control of the distance of separation between the upper tip section 19 and the lower tip section 26. The outer shell of the crawfish tail 5 is held in the opposite hand; the tips 19 and 23 are squeezed together just sufficiently to jointly enter the shell 5 at the outer edges of the tail meat 7 at the uppermost and bottom most parts essentially at the same time. As was noted a properly cooked crawfish tail has a strong curve. The differential curvatures of the upper tong 11 and the lower tong 13 and the inward curving tips 19 and 26 guide the tongs 11 and 13 in along the inner surfaces of the shell 5. The essentially flat midsection 17 of upper tong 11 straightens the crawfish shell 5 by applying a straightening force along the substantially larger upper plates of the crawfish tail 5. This straightening action in turn permits the lower tip 26 and the upper tip 19 to penetrate further into the shell without cutting into the crawfish meat 7 and without breaking out and existing between the joints of the tail 5. A gentle pushing action is all that is necessary to fully insert the tongs 11 and 13 fully into the shell 5 until the base 27 of the shell is reached. At this point, the transverse concave curved sections of upper tong 11 and lower tong 13 have caused the two tongs to fully envelop the body of the meat 7. The substantially shallower curvature of the bottom tong 13 has mated with the slightly flattened nature of the bottom of crawfish shell 5 and has guided the tip 26 between and through any ligamentary connections between the crawfish meat 7 and the intermediate sections of shell 5. The crawfish meat 7 at this point remains substantially connected to the tail 5 solely by a extensive ligamentary connection at the root 27 of the tail 5. The finger and thumb of the hand holding the tool, which as aforementioned, are positioned opposingly on the upper spring base section 15 and lower spring base section 23, then apply a slight squeezing force, clamping the upper tong 11 and the lower tong 13 firmly around the meat 7. The double concave curvature of the two tong members 11 and 13 uniformly transmit this force through the meat and the meat is not broken or extruded by this squeezing. The inward curvature of the tips 19 and 26 together with, optionally, the additional traction provided by the inner serrations 21 at the tips, then firmly grasp the meat 7 at the tail 5 and the hand withdraws the crawfish peeler 1; all the force of withdrawal concentrates solely at the very tail connection 27 breaking the meat free from the tail 5 and extracting it, as shown, as a single piece of uniform crawfish meat 7.

As can be seen from the above description this is a very simple process requiring limited skill and experience; it becomes a very rapid, two step, insert and withdrawal method of removing the meat from the tail of a crawfish.

As those who have had some experience with crawfish are well aware, the current manual method of meat extraction is slow in the extreme. The combined tenderness of the meat of the crawfish and the extreme hardness of the shell made a crawfish considerably more difficult than a shrimp to peel.

It has thus become customary, in manually shucking crawfish tails 5, to attempt to squeeze the meat 7 out of the crawfish tail 5 in a manner much akin to squeezing a tube of toothpaste from the bottom. The difficulties of this technique are manifold. Too strong a squeeze merely crushes the crawfish tail 5 at the root 27 providing no extruding action, destroying much of the meat 7, and making it much harder to extract shell fragments from the meat 7. The alternative of peeling the sections of the shell 5 proved greatly unsatisfactory, as a force sufficient to break apart the substantially strong and hard outer shell 5 is more than sufficient to crush and displace the meat 7 resulting in breaking the meat 7 into small fragments.

As a result, without this invention, a considerable amount of skill and experience is required to obtain crawfish meat 7 from crawfish tails 5, relatively high wastage is observed and a relatively low speed of crawfish meat removal is seen.

This fact has possibly been a strong contributing factor to the observed economic result that, although crawfish are less common than shrimp and require more effort to farm and raise, the relative price of crawfish by the pound has often averaged less than a quarter of the price of the equivalent weight of shrimp, even in areas where crawfish is the preferred food to shrimp.

Thus as has been seen from this detailed description, the crawfish peeler 1 as described and its equivalents provide a singularly simple and yet far more efficient method of removing crawfish meat from a crawfish shell. It has been observed that even in slightly skilled hands an individual using this crawfish peeler can remove meat from a quantity of crawfish in a time approximately one-fifth the time necessary to handpeel the crawfish.

This detailed description has been of an existing preferred embodiment of this invention, but as can be seen and as will be readily understood from the detailed description, this invention covers a much wider range of equivalents in function; there seems to be no reason why the basic dual differential curvature and opposing spring tong concept could not be expanded, with the application of a mechanical squeeze means to much larger crustaceans such as lobster tails.

Thus this invention covers not only the specific implementation described above but all equivalents as covered by the claims.

I claim:

1. An apparatus for removing intact meat from the tail shell of a crawfish or similar crustacean, comprising:
   (a) a handle means for grasping with hand;
   (b) an upper tong means having a spring upwardly curving base section attached at one end to the handle, an elongated midsection having a convex cross-section, and a downwardly curved tip section;
   (c) a lower tong means having a downwardly curved spring base section attached at one end to the handle means opposite said upper base section, an elongated midsection, having a convex cross-section with the curve being of a relatively larger radius than that of the upper tong midsection, and an upwardly curved tip section.

2. An apparatus as described in claim 1, wherein the handle comprises
   a curved handle adaptingly fitted to the inner surface of the hand.

3. The apparatus as described in claim 1, wherein it further comprises:
   a. serrations along the inner surface of the tip of the upper tong; and serrations along the inner surface of the tip of the lower tong.

4. A method for removing intact meat from the tail of a crustacean, comprising the steps of:
   a. removing the tail from the body of the crustacean;
   b. providing a tong means attached to a handle, with an upper tong means having a portion with a convex cross section and a lower tong means having an opposing portion with a convex cross-section with a relatively large radius than that of the upper tong portion;
   c. inserting tip sections of the upper and lower tongs between the meat within the crustacean tail and a shell of the tail;
   d. inserting convex portions of the upper and lower tong means between the meat and shell of the tail, thereby breaking ligamentary points of attachment of the meat to the shell and straightening the shell;
   e. squeezing the tongs together, thereby gripping the meat between the tongs;
   f. withdrawing the squeezed together tongs, forcibly removing thereby the meat from the tail of the crustacean, breaking the remaining tail attachment point at the nether end of the meat.

* * * * *